US012734856B2

(12) United States Patent
Kim et al.

(10) Patent No.: US 12,734,856 B2
(45) Date of Patent: Sep. 15, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Hyungjin Kim, Seoul (KR); Sungki Jung, Seoul (KR); Seongjin Kim, Hwaseong-si (KR); Donghun Lim, Gwangmyeong-si (KR); JongHoon Choi, Suwon-si (KR); YoungJae Kim, Yongin-si (KR); Minseo Cha, Hwaseong-si (KR); Hyeonjun Kim, Hwaseong-si (KR); Inyong Jung, Incheon (KR); Byungjoo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 132 days.

(21) Appl. No.: 18/631,904

(22) Filed: Apr. 10, 2024

(65) Prior Publication Data

US 2025/0115091 A1 Apr. 10, 2025

(30) Foreign Application Priority Data

Oct. 5, 2023 (KR) ........................ 10-2023-0132414

(51) Int. Cl.
*B60G 17/016* (2006.01)
*B60G 17/0165* (2006.01)

(52) U.S. Cl.
CPC ..... *B60G 17/0164* (2013.01); *B60G 17/0165* (2013.01); *B60G 2400/106* (2013.01);
(Continued)

(58) Field of Classification Search
CPC ............ B60G 17/0164; B60G 17/0165; B60G 17/06; B60G 2400/102; B60G 2400/106;
(Continued)

(56) References Cited

U.S. PATENT DOCUMENTS 4,796,911 A * 1/1989 Kuroki ............... B60G 21/0558 280/5.511
8,483,928 B2 * 7/2013 Shida ..................... G08G 1/161 701/96

(Continued)

FOREIGN PATENT DOCUMENTS

KR 20190128290 A 11/2019
KR 20210022296 A 3/2021

*Primary Examiner* — Carl C Staubach
(74) *Attorney, Agent, or Firm* — Lempia Summerfield Katz LLC

(57) ABSTRACT

Disclosed is a vehicle and a control method thereof. The vehicle includes: a sensor unit for detecting driving information of a vehicle; a front wheel suspension and a rear wheel suspension, each provided on a front wheel and a rear wheel of the vehicle, respectively, and each including a spring and a damper; and a control unit for, when a driving mode of the vehicle is an autonomous driving mode or a semi-autonomous driving mode, setting the degree of sensitivity for controlling damping force of the front wheel suspension and rear wheel suspension based on a distance to a vehicle ahead detected by the sensor unit, and adjusting the damping force of the front wheel suspension and rear wheel suspension according to a state of a change in distance to the vehicle ahead and a state of acceleration and deceleration of the vehicle.

15 Claims, 6 Drawing Sheets

(52) U.S. Cl.
CPC .... *B60G 2400/60* (2013.01); *B60G 2400/823* (2013.01); *B60G 2500/10* (2013.01)

(58) Field of Classification Search
CPC ............ B60G 2400/60; B60G 2400/82; B60G 2400/823; B60G 2401/142; B60G 2500/10
See application file for complete search history.

(56) References Cited

U.S. PATENT DOCUMENTS

| | | | | |
|---|---|---|---|---|
| 8,762,000 | B2 * | 6/2014 | Schindler | B60G 17/018 701/41 |
| 11,110,770 | B2 | 9/2021 | Kim | |
| 11,524,542 | B2 | 12/2022 | Kim | |
| 2002/0161506 | A1 * | 10/2002 | Ishizu | B60K 31/0008 701/96 |
| 2007/0088475 | A1 * | 4/2007 | Nordgren | B60G 17/018 701/37 |
| 2014/0195116 | A1 * | 7/2014 | Hrovat | B60W 30/143 701/38 |
| 2017/0334454 | A1 * | 11/2017 | Abe | B60W 50/0098 |
| 2019/0176811 | A1 * | 6/2019 | Cho | B60W 10/119 |
| 2019/0344634 | A1 * | 11/2019 | Kim | B60G 17/0165 |
| 2020/0079373 | A1 * | 3/2020 | Ortmann | B60W 10/08 |
| 2020/0348669 | A1 * | 11/2020 | Kim | E05F 15/73 |
| 2020/0384980 | A1 * | 12/2020 | Yu | G05D 1/0088 |
| 2021/0053409 | A1 * | 2/2021 | Kim | B60G 17/06 |
| 2021/0094533 | A1 * | 4/2021 | Yoon | B60W 40/12 |
| 2021/0178845 | A1 * | 6/2021 | Cho | G01S 19/42 |
| 2023/0076272 | A1 | 3/2023 | Kim | |
| 2023/0271469 | A1 * | 8/2023 | Birch | B60G 17/016 701/23 |
| 2024/0246565 | A1 * | 7/2024 | Quan | B60W 50/0098 |
| 2025/0242648 | A1 * | 7/2025 | Payagalage-Don | B60G 17/016 |

* cited by examiner

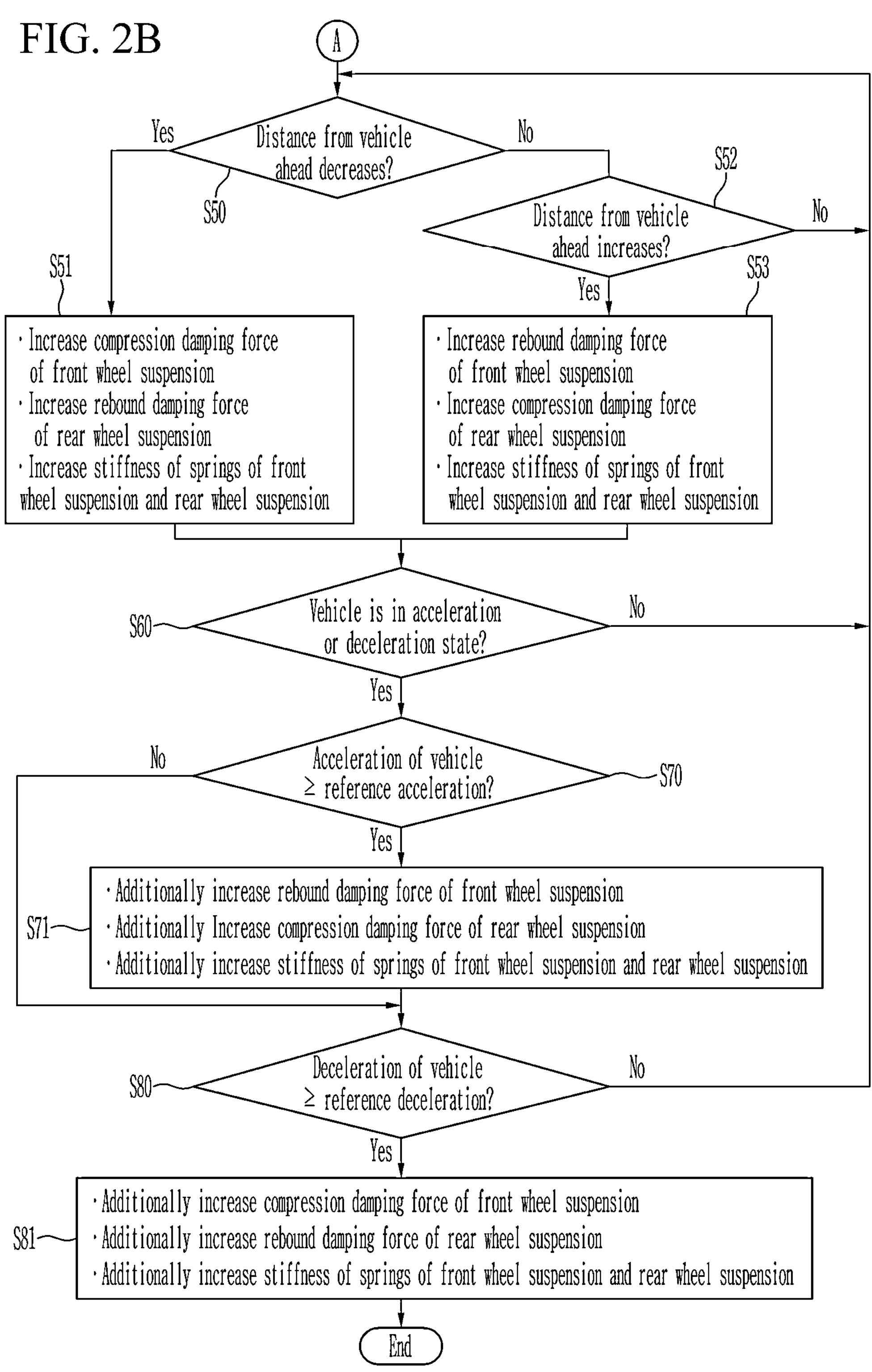
FIG. 2B
A
Distance from vehicle ahead decreases?
S50
Yes
No
S52
Distance from vehicle ahead increases?
No
Yes
S51
S53
· Increase compression damping force of front wheel suspension
· Increase rebound damping force of rear wheel suspension
· Increase stiffness of springs of front wheel suspension and rear wheel suspension
· Increase rebound damping force of front wheel suspension
· Increase compression damping force of rear wheel suspension
· Increase stiffness of springs of front wheel suspension and rear wheel suspension
S60
Vehicle is in acceleration or deceleration state?
No
Yes
No
Acceleration of vehicle ≥ reference acceleration?
S70
Yes
S71
· Additionally increase rebound damping force of front wheel suspension
· Additionally Increase compression damping force of rear wheel suspension
· Additionally increase stiffness of springs of front wheel suspension and rear wheel suspension
S80
Deceleration of vehicle ≥ reference deceleration?
No
Yes
S81
· Additionally increase compression damping force of front wheel suspension
· Additionally increase rebound damping force of rear wheel suspension
· Additionally increase stiffness of springs of front wheel suspension and rear wheel suspension
End

VEHICLE AND METHOD OF CONTROLLING THE SAME

CROSS-REFERENCE TO RELATED APPLICATION

This application claims priority to and the benefit of Korean Patent Application No. 10-2023-0132414 filed in the Korean Intellectual Property Office on Oct. 5, 2023, the entire contents of which are incorporated herein by reference.

BACKGROUND

(a) Field of the Disclosure

The disclosure relates to a vehicle and a method of controlling the same, and more particularly to a vehicle and a method of controlling the same that are capable of improving the ride comfort of a passenger through control of a suspension when the vehicle is in an autonomous driving situation.

(b) Description of the Related Art

In general, when a vehicle is traveling on a road with an uneven surface, it may scratch the underside of the body, or cause an uncomfortable ride for the driver or passengers due to shock or vibration.

As such, vehicles are equipped with suspensions to prevent damage to the vehicle body and to improve the ride comfort of the driver or passengers. The suspension is connected to the axle to prevent vibrations or shocks from the road surface from being transmitted directly to the vehicle body during the traveling of the vehicle, thereby preventing damage to the vehicle body or improving the ride comfort of the passengers.

In recent years, vehicles have been equipped with Electronically Controlled Suspensions (ECS) that adjust the stiffness of the suspension according to the driving conditions of the vehicle or the road surface.

The electronically controlled suspension may detect the vehicle's driving state, such as vehicle speed, vehicle acceleration, and steering angle, and road surface information through various sensor devices, and adjust the spring constant of the suspension, the damping force of the damper, the posture of the vehicle, and the height of the vehicle based on the vehicle's driving state and road surface information.

In addition, the introduction of autonomous or semi-autonomous vehicles has increased in recent years, and when a vehicle travels in an autonomous or semi-autonomous state, a momentary intervention by a vehicle ahead of the vehicle may cause the vehicle to brake suddenly, and the resulting vehicle behavior may be unpleasant for the driver.

The matters described in the description of the related art are prepared to enhance the understanding of the background of the disclosure, and may include matters that are not already known to those having ordinary skill in the art to which the present technology belongs.

SUMMARY

The present disclosure attempts to provide a vehicle and a method of controlling the same that are capable of proactively controlling a suspension in preparation for a momentary intervention by a vehicle ahead of the vehicle in an autonomous or semi-autonomous driving situation.

An embodiment of the present disclosure provides a vehicle including: a sensor unit for detecting driving information of a vehicle; a front wheel suspension and a rear wheel suspension, each provided on a front wheel and a rear wheel of the vehicle, and each including a spring and a damper; and a control unit for, when a driving mode of the vehicle is an autonomous driving mode or a semi-autonomous driving mode, setting the degree of sensitivity for controlling damping force of the suspension based on a distance to a vehicle ahead detected by the sensor unit, and adjusting the damping force of the suspension according to a state of a change in distance to the vehicle ahead and a state of acceleration and deceleration of the vehicle.

In some embodiments, the driving information detected by the sensor unit may include a road surface condition of a road, the distance to the vehicle ahead, an acceleration of the vehicle, and a deceleration of the vehicle.

In some embodiments, the control unit may set the degree of sensitivity for controlling the damping force of the suspension to a first mode when the distance to the vehicle ahead is less than a first reference distance, set the degree of sensitivity for controlling the damping force of the suspension to a second mode when the distance to the vehicle ahead is equal to or greater than the first reference distance and less than a second reference distance, and set the degree of sensitivity for controlling the damping force of the suspension to a third mode when the distance to the vehicle ahead is equal to or greater than the second reference distance.

In some embodiments, when a state of the change in distance from the vehicle ahead is a decreasing state, the control unit may increase compression damping force of the suspension of the front wheel, and increase rebound damping force of the suspension of the rear wheel.

In some embodiments, when a state of the change in distance from the vehicle ahead is an increasing state, the control unit may increase rebound damping force of the suspension of the front wheel, and increase compression damping force of the suspension of the rear wheel.

In some embodiments, when an acceleration of the vehicle is equal to or greater than a reference acceleration, the control unit may additionally increase rebound damping force of the suspension of the front wheel, and additionally increase compression damping force of the suspension of the rear wheel. In some embodiments, when a deceleration of the vehicle is equal to or greater than a reference deceleration, the control unit may additionally increase compression damping force of the suspension of the front wheel, and additionally increase rebound damping force of the suspension of the rear wheel.

In some embodiments, only when a flatness of a road surface condition of a front road (i.e., road ahead of the vehicle) detected by the sensor unit is equal to or greater than a reference flatness, the control unit may adjust the degree of sensitivity for controlling damping force of the suspension and the damping force of the suspension.

Another embodiment of the present disclosure provides a method of controlling a vehicle, the method including: determining, by a control unit, whether a vehicle is in an autonomous driving state or a semi-autonomous driving state; setting, by the control unit, the degree of sensitivity for controlling damping force of a suspension based on a distance from a vehicle ahead of the vehicle; adjusting, by the control unit, the damping force of the suspension based on a state of a change in the distance from the vehicle ahead; and additionally adjusting, by the control unit, the damping force of the suspension based on an acceleration or a deceleration of the vehicle.

In some embodiments, in the setting of the degree of sensitivity for controlling damping force of the suspension, when the distance from the vehicle ahead is less than a first reference distance, the degree of sensitivity for controlling the damping force of the suspension may be set to a first mode, when the distance from the vehicle ahead is equal to or greater than the first reference distance and less than a second reference distance, the degree of sensitivity for controlling the damping force of the suspension may be set to a second mode, and when the distance from the vehicle ahead is equal to or greater than the second reference distance, the degree of sensitivity for controlling the damping force of the suspension may be set to a third mode.

In some embodiments, when the state of the change in distance from the vehicle ahead is a decreasing state, compression damping force of a suspension of the front wheel may increase, and rebound damping force of a suspension of the rear wheel may increase.

In some embodiments, when the state of the change in distance from the vehicle in front is an increasing state, rebound damping force of a suspension of the front wheel may increase, and compression damping force of a suspension of the rear wheel may increase.

In some embodiments, when an acceleration of the vehicle is equal to or greater than a reference acceleration, rebound damping force of a suspension of the front wheel may additionally increase, and compression damping force of a suspension of the rear wheel may additionally increase.

In some embodiments, when a deceleration of the vehicle is equal to or greater than a reference deceleration, the control unit may additionally increase compression damping force of a suspension of the front wheel, and may additionally increase rebound damping force of a suspension of the rear wheel.

In some embodiments, the method may further include determining, by the control unit, whether a flatness of a road ahead is equal to or greater than a reference flatness, in which wherein only when the flatness of the road ahead is equal to or greater than the reference flatness, the degree of sensitivity for controlling the damping force of the suspension may be set, and damping force of the suspension may be adjusted.

According to the embodiments, by predicting a driving behavior of a vehicle in advance and proactively responding to the suspension in anticipation of a pitch motion, pitch motion may be quickly suppressed when the pitch motion actually occurs.

Other effects that may be obtained or anticipated by the embodiments of the present disclosure are disclosed, directly or by implication, in the detailed description of the present disclosure. In other words, the various effects anticipated by the present disclosure are disclosed in the detailed description that follows.

BRIEF DESCRIPTION OF THE DRAWINGS

These drawings are for reference in describing an embodiment of the present disclosure, and the technical spirit of the present disclosure should not be construed as being limited to the accompanying drawings.

Figure 1:
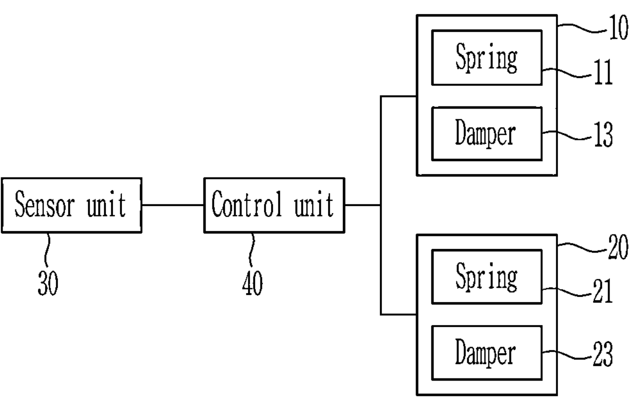
FIG. 1 is a block diagram illustrating a configuration of a vehicle according to an embodiment.

It should be understood that the foregoing referenced drawings are not necessarily illustrated in accordance with the scale, and they present somewhat brief expression of various characteristics illustrating the basic principle of the present disclosure. For example, the specific design characteristics of the present disclosure including a specific dimension, direction, location, and shape may be partially determined by a particular intended application and use environment.

DETAILED DESCRIPTION OF THE EMBODIMENTS

The terms used herein are for the purpose of describing specific embodiments, and are not intended to limit the present disclosure. As used herein, singular forms are intended to include plural forms, unless the context explicitly indicates otherwise. The terms "include" and/or "including" specify the presence of the mentioned characteristics, integers, steps, operations, constituent elements, and/or components when used in the present specification, but it will also be understood that this does not exclude the presence or addition of one or more of other characteristics, integers, steps, operations, constituent elements, components, and/or groups thereof. As used herein, the term "and/or" includes any one or any combination of the items listed in connection therewith.

In addition, it is understood that one or more of the methods below or the aspects thereof may be executed by at least one or more controllers. The term "controller" may refer to a hardware device including a memory and a processor.

The memory is configured to store program commands, and the processor is specially programmed so as to execute program commands to perform one or more processes described in more detail below. The controller may control operations of units, modules, components, devices, or similar matters thereof as described herein. Further, it is understood that the following methods may be executed by a device including a controller together with one or more other components as recognized by those having ordinary skill in the art.

Further, the controller of the present disclosure may be implemented as a non-transitory computer readable recording medium including program commands executable by a processor. Examples of the computer readable recording medium includes a read only memory (ROM), a random access memory (RAM), a compact disc (CD) ROM, magnetic tapes, floppy discs, flash drives, smart cards, and optical data storage devices, but the computer readable recording medium is not limited thereto. The computer readable recording medium may also be dispersed across the computer network to store and execute program commands by a distributed method, such as a telematics server or a controller area network (CAN).

Hereinafter, embodiments of the present disclosure are described with reference to accompanying drawings so as to be easily understood by a person ordinary skilled in the art. The present disclosure may be variously implemented and is not limited to the following embodiments.

The drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present disclosure is not limited thereto, and the thickness of layers, films, panels, regions, and the like, are exaggerated for clarity.

Suffixes, "module" and/or "unit" for a constituent element used for the description below are given or mixed in consideration of only easiness of the writing of the specification, and the suffix itself does not have a discriminated meaning or role.

Further, in describing the embodiments disclosed in the present disclosure, when it is determined that a detailed description relating to well-known functions or configurations may make the subject matter of the embodiment disclosed in the present disclosure unnecessarily ambiguous, the detailed description has been omitted.

Further, the accompanying drawings are provided for helping to easily understand embodiments disclosed in the present specification, and the technical spirit disclosed in the present specification is not limited by the accompanying drawings, and it should be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms.

In the description below, expressions described in the singular form may be construed in the singular or plural unless an explicit expression such as "one" or "single" is used.

The terms are used only to discriminate one constituent element from another constituent element.

In the flowcharts described with reference to the drawings, the order of operations may be changed, several operations may be merged, some operations may be divided, and specific operations may not be performed.

Hereinafter, a vehicle according to an embodiment is described in detail with reference to the accompanying drawings.

FIG. 1 is a block diagram illustrating a configuration of a vehicle according to an embodiment.

As shown in FIG. 1, a vehicle according to an embodiment may include a sensor unit 30, a suspension, and a control unit 40.

The sensor unit 30 detects driving information including a road surface condition, a speed of a vehicle ahead of the vehicle, a distance to a vehicle ahead of the vehicle, the amount of a change in a distance to a vehicle ahead of the vehicle, an acceleration state of the vehicle, a braking state of the vehicle, an acceleration of the vehicle, and a deceleration of the vehicle, and the detected driving information is transmitted to the control unit 40.

To this end, the sensor unit 30 may include a camera for detecting a road surface condition of a road, a speed sensor for detecting a speed of a vehicle ahead of the vehicle and the own vehicle (hereinafter referred to as "the vehicle" as needed), a distance sensor for detecting a distance from a vehicle ahead of the vehicle, an accelerator pedal sensor for detecting an acceleration state of the vehicle, and a brake pedal sensor for detecting a braking state of the vehicle.

The camera captures the road surface in front of the vehicle and may acquire image data about the road surface ahead of the vehicle. The control unit 40 may calculate the flatness of the road ahead of the vehicle from the image data captured by the camera.

The acceleration pedal sensor (APS) may detect the amount of accelerator pedal pressed (i.e., an amount of changed position of the accelertor pedal) and detect the acceleration state of the vehicle from the amount of accelerator pedal pressed.

The brake pedal sensor (BPS) may detect the amount of brake pedal pressed (i.e., an amount of changed position of the brake pedal) and detect the braking state of the vehicle from the amount of brake pedal pressed.

The sensor unit 30 may further include a driving mode selection button manipulated by a driver. The vehicle may travel in an autonomous driving mode or a semi-autonomous driving mode through the driving mode selection button manipulated by a driver.

The suspension may include a front wheel suspension 10 and a rear wheel suspension 20, each of which may include a spring (front wheel spring 11, rear wheel spring 21) and a damper (front wheel damper 13, rear wheel damper 23). In one embodiment, the suspension may be implemented as an electronically controlled suspension (ECS).

The spring 11, 21 may compress and tense depending on the condition of the road surface, absorbing vibrations or shocks from the road surface. In this embodiment, the spring 11, 21 may be implemented with an air spring of which stiffness and height are adjustable.

The damper 13, 23 may dampen vibrations caused by the spring 11, 21. A damper 13, 23 may provide force in the opposite direction of the force generated by the spring 11, 21, creating damping force that suppresses the vibration of the spring 11, 21.

In one embodiment, the damper 13, 23 may include a piston rod and a solenoid valve. The damper 13, 23 may generate damping force through a compression stroke and a rebound stroke. In the present disclosure, the damping force that suppresses vibration in the direction in which the spring 11, 21 is compressed is referred to as compression damping force, and the damping force that suppresses vibration in the direction in which the spring 11, 21 is rebound is referred to as rebound damping force. The movement of the solenoid valve regulates the size of the flow path, which is the movement path for the fluid, and thus the damping force may be adjusted. The suspension may have the controlled damping force of the damper based on a control signal transmitted from the control unit 40.

The control unit 40 may control the operation of the suspension based on the driving information detected by the sensor unit 30.

To this end, the control unit 40 may be implemented as one or more processors operated by a set program, and program commands are stored in the memory of the control unit 40 that are programmed to cause the one or more processors to perform each operation of a method of controlling a vehicle according to the present disclosure.

Hereinafter, a method of controlling a vehicle according to an embodiment is described in detail with reference to the attached drawings.

Figure 2A:
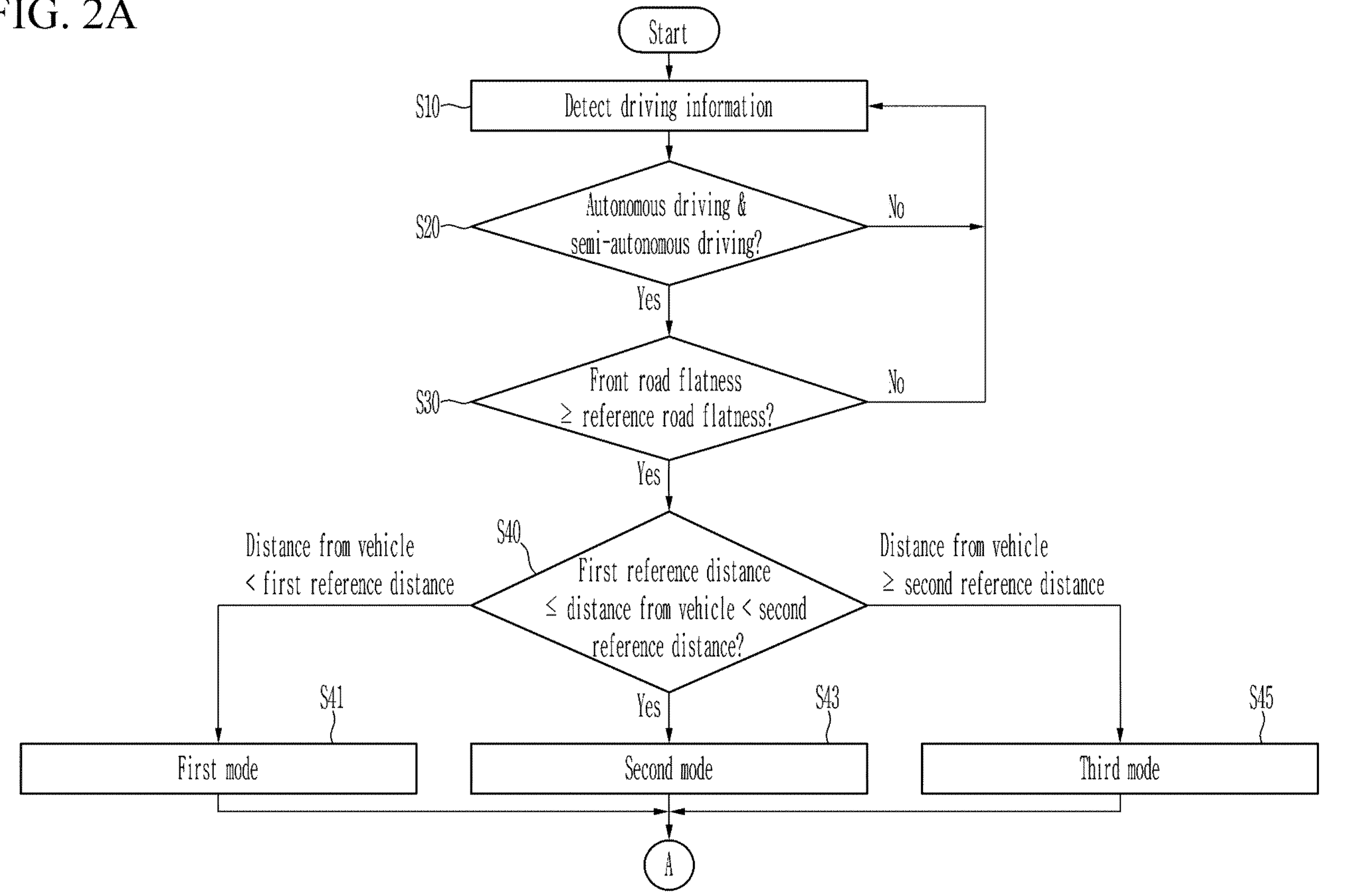
FIG. 2 is a flow diagram illustrating a method of controlling a vehicle according to an embodiment.

FIG. 2 is a flowchart illustrating a method for controlling a vehicle according to an embodiment.

Referring to FIG. 2, the sensor unit 30 detects driving information including a road surface condition, a speed of a vehicle ahead of the vehicle, a distance to the vehicle ahead of the vehicle, the amount of a change in a distance to the vehicle ahead of the vehicle, an acceleration state of the vehicle, a braking state of the vehicle, an acceleration of the vehicle, and transmits the detected driving information to the control unit (S10).

The control unit 40 determines whether the vehicle is in an autonomous driving state or a semi-autonomous driving state (S20). The control unit 40 may determine the autonomous driving state or the semi-autonomous driving state based on a manipulation of the driving mode selection button by a manipualtion of the driver.

When the vehicle is in the autonomous driving state or the semi-autonomous driving state, the control unit 40 determines whether flatness of the road ahead of the vehicle is equal to or greater than a reference flatness (S30). The control unit 40 may calculate the flatness of the road ahead from the image data detected by the sensor unit 30.

When the flatness of the road ahead is equal to or greater than the reference flatness (i.e., the road ahead has less road curvature and less road roughness), the control unit 40 sets the degree of sensitivity for controlling the damping force of the suspension based on the distance to the vehicle ahead.

Specifically, the control unit 40 determines whether the distance to the vehicle ahead (vehicle distance) is less than a first reference distance or equal to or greater than a second reference distance (S40).

When the distance to the vehicle ahead is less than the first reference distance (i.e., the vehicle is close to the vehicle ahead), the control unit 40 sets the degree of sensitivity for controlling the damping force of the suspension to a first mode (S41).

When the distance to the vehicle ahead is equal to or greater than the first reference distance (for example, 100 meters), the control unit 40 determines whether the distance to the vehicle ahead is less than the second reference distance (e.g., 150 meters) that is greater than the first reference distance. When the distance to the vehicle ahead is equal to or greater than the first reference distance and less than the second reference distance, the control unit 40 sets the degree of sensitivity for controlling the damping force of the suspension to a second mode (S43).

When the distance to the vehicle ahead is equal to or greater than the second reference distance, the control unit 40 sets the degree of sensitivity for controlling the damping force of the suspension to a third mode (S45).

In the first mode, the degree of sensitivity for controlling the damping force of the suspension is set to be large, in the third mode, the degree of sensitivity for controlling the damping force of the suspension is set to be small, and in the second mode, the degree of sensitivity for controlling the damping force of the suspension is set to be between the first mode and the third mode.

When the degree of sensitivity for controling the damping force of the suspension is increased, as in the first mode, the damping force of the suspension may be adjusted to be large through a relatively small control input. This means that when the degree of sensitivity is large, the damping force of the suspension may be controlled relatively quickly. So, when the vehicle is close to the vehicle ahead, the degree of sensitivity to control the damping force may be set to be large and the damping force of the suspension may be adjusted quickly through a small control input.

Conversely, when the degree of sensitivity to control the damping force of the suspension is reduced, as in the third mode, the damping force of the suspension may be adjusted to be large through a relatively large control input. This means that when the degree of sensitivity is small, the damping force of the suspension may be controlled relatively slowly. Therefore, when the vehicle is far from the vehicle ahead, the degree of sensitivity to control the damping force may be set to be small and the damping force of the suspension may be adjusted slowly through a large control input.

The control unit 40 adjusts the damping force of the suspension based on the change in distance from the vehicle ahead (or based on the change in distance from the vehicle ahead).

Specifically, the control unit 40 determines whether a state of the change in distance from the vehicle ahead is in a decreasing state (S50).

When the state of the change in distance from the vehicle ahead is in the decreasing state, the control unit 40 increases the amount of compression control for the front wheel suspension 10 and increases the amount of rebound control for the rear wheel suspension 20. Then, stiffness of the spring 11, 21 is increased (S51).

When the amount of compression control for the front wheel suspension 10 increases, the compression damping force of the front wheel suspension 10 increases, and when the amount of rebound control for the rear wheel suspension 20 increases, the rebound damping force of the rear wheel suspension 20 increases. In this case, the stiffness of the springs 11, 21 of the front wheel suspension 10 and the rear wheel suspension 20 is also increased.

When the state of the change in distance from the vehicle ahead is in the decreasing state, a vehicle operating in the autonomous driving mode or the semi-autonomous driving mode decreases the speed, which may have a high possibility to cause a dive phenomenon in which the front of the vehicle body leans forward (hereinafter referred to as "forward pitch motion" as needed).

Figure 3A:
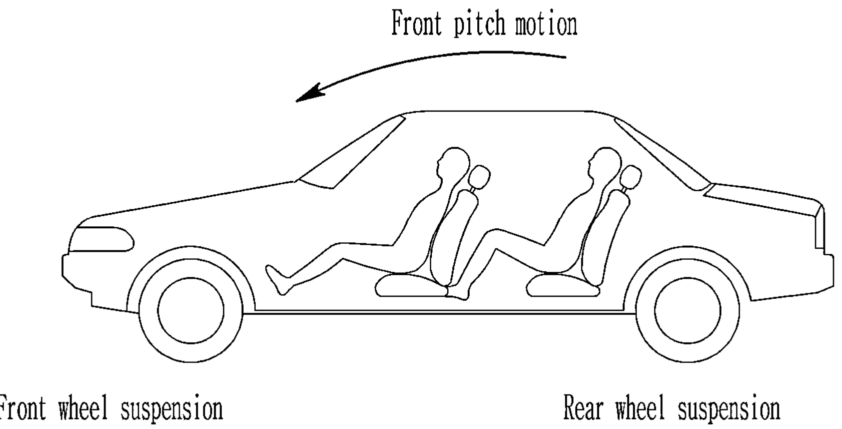
FIG. 3A and FIG. 3B are diagrams illustrating a method of suppressing a pitch motion of a vehicle according to an embodiment.

In this case, the control unit 40 proactively performs suspension control to suppress the forward pitch motion. In other words, the spring 11, 21 stiffness of the front wheel suspension 10 and the rear wheel suspension 20 is increased to suppress the forward pitch motion, the compression damping force to suppress vibration in the direction in which the front wheel spring 11 of the front wheel suspension 10 is compressed is increased, and the rebound damping force to suppress vibration in the direction in which the rear wheel spring 21 of the rear wheel suspension 20 is rebound is increased (see FIG. 3A).

In this way, by proactively performing the suspension control to suppress the forward pitch motion based on the amount of the change in distance to the vehicle ahead (or the state of the change in distance), when the forward pitch motion actually occurs, the forward pitch motion may be quickly suppressed.

When the state of the change in distance from the vehicle ahead is not in the decreasing state, the control unit 40 determines whether the state in the change in distance from the vehicle ahead is in the increasing state (S52). When the state of the change in distance from the vehicle ahead is in the increasing state, the control unit 40 increases the amount of rebound control of the front wheel suspension 10 and increases the amount of compression control of the rear wheel suspension 20. Then, the stiffness of the spring 11, 21 is increased (S53).

When the amount of rebound control for the front wheel suspension 10 increases, the rebound damping force of the front wheel suspension 10 is increased, and when the amount of compression control for the rear wheel suspension 20 increases, the compression damping force of the rear wheel suspension 20 is increased. In this case, the stiffness of the springs 11, 21 of the front wheel suspension 10 and the rear wheel suspension 20 is also increased.

When the state of the change in distance to the vehicle ahead is in an increasing state, the vehicle operating in the autonomous driving mode or the semi-autonomous mode increases a vehicle speed, which may have a high possibility to cause a squat phenomenon in which the front of the vehicle is lifted (hereinafter referred to as a "rear pitch motion" as necessary).

Figure 3B:
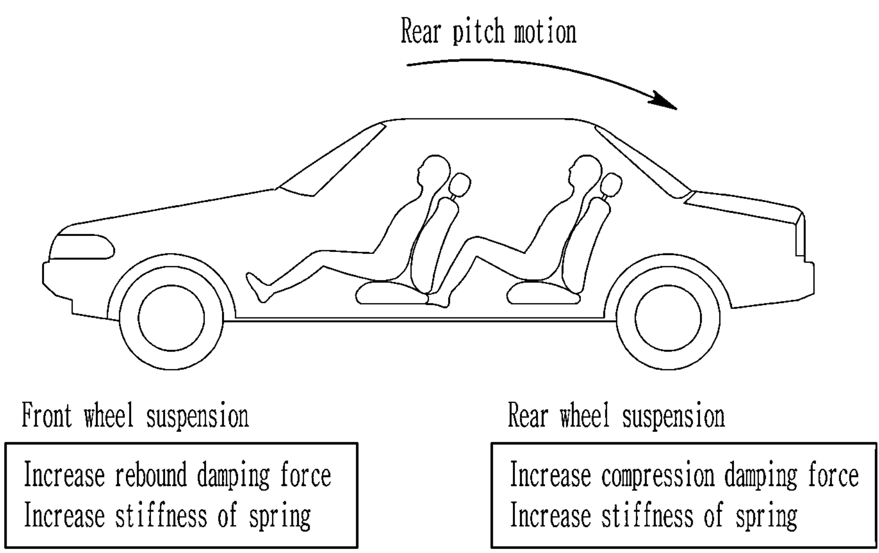

In this case, the control unit 40 proactively performs suspension control to suppress the rear pitch motion. In other words, the spring 11, 21 stiffness of the front wheel suspension 10 and the rear wheel suspension 20 is increased to suppress the rear pitch motion, the compression damping force to suppress vibration in the direction in which the front wheel spring 11 of the front wheel suspension 10 is rebound is increased, and the compression damping force to suppress vibration in the direction in which the rear wheel spring 21 of the rear wheel suspension 20 is compressed rebound is increased (see FIG. 3B).

As described above, by proactively performing the suspension control to suppress the rear pitch motion, when the rear pitch motion actually occurs, the rear pitch motion may be quickly suppressed.

The control unit 40 determines whether the vehicle is in an accelerating state or a braking state (S60).

When the vehicle is in the accelerating state, the control unit 40 determines whether the acceleration of the vehicle is equal to or greater than a reference acceleration (S70).

When the acceleration of the vehicle is equal to or greater than the reference acceleration (i.e., the vehicle is accelerating suddenly), the control unit 40 increases the amount of rebound control for the front wheel suspension 10 and increases the amount of compression control for the rear wheel suspension 20. Then, the stiffness of the spring 11, 21 is increased (S71).

The amount of suspension control (rebound damping force of the front wheel suspension 10, compression damping force of the rear wheel suspension 20, and stiffness of the spring 11, 21) determined when the acceleration of the vehicle is equal to or greater than the reference acceleration may be greater than the amount of suspension control (rebound damping force of the front wheel suspension 10, compression damping force of the rear wheel suspension 20, and stiffness of the spring 11, 21) determined when the distance to the vehicle ahead increases.

When the amount of rebound control on the front wheel suspension 10 increases, the rebound damping force of the front wheel suspension 10 increases, and when the amount of compression control on the rear wheel suspension 20 increases, the compression damping force of the rear wheel suspension 20 increases. In this case, the stiffness of the springs 11, 21 of the front wheel suspension 10 and the rear wheel suspension 20 is also increased.

When the vehicle is accelerating suddenly, the squat phenomenon in which the front of the body is lifted (rear pitch motion) occurs.

In this case, the control unit 40 proactively performs suspension control to suppress the rear pitch motion. In other words, the spring 11, 21 stiffness of the front wheel suspension 10 and the rear wheel suspension 20 is increased to suppress the rear pitch motion, the compression damping force to suppress vibration in the direction in which the front wheel spring 11 of the front wheel suspension 10 is rebound is increased, and the compression damping force to suppress vibration in the direction in which the rear wheel spring 21 of the rear wheel suspension 20 is compressed rebound is increased (see FIG. 3B).

As described above, by proactively performing the suspension control to suppress the rear pitch motion based on the acceleration of the vehicle, when the rear pitch motion actually occurs, the rear pitch motion may be quickly suppressed.

When the vehicle is in the braking state, the control unit 40 determines whether the deceleration of the vehicle is equal to or greater than a reference deceleration (S80).

When the deceleration of the vehicle is equal to or greater than the reference deceleration (i.e., the vehicle is braking suddenly), the control unit 40 increases the amount of compression control for the front wheel suspension 10 and increases the amount of rebound control for the rear wheel suspension 20. Then, the stiffness of the spring 11, 21 is increased (S81).

The amount of suspension control (compression damping force of the front wheel suspension 10, rebound damping force of the rear wheel suspension 20, and stiffness of the spring 11, 21) determined when the deceleration of the vehicle is equal to or greater than the reference deceleration may be greater than the amount of suspension control (compression damping force of the front wheel suspension 10, rebound damping force of the rear wheel suspension 20, and stiffness of the spring 11, 21) determined when the distance to the vehicle ahead decreases.

When the amount of compression control on the front wheel suspension 10 increases, the compression damping force of the front wheel suspension 10 increases, and when the amount of rebound control on the rear wheel suspension 20 increases, the rebound damping force of the rear wheel suspension 20 increases. In this case, the stiffness of the springs 11, 21 of the front wheel suspension 10 and the rear wheel suspension 20 is also increased.

When the vehicle brakes suddenly, the dive phenomenon (forward pitch motion) in which the front of the vehicle dives forwardly occurs.

In this case, the control unit 40 proactively performs suspension control to suppress the forward pitch motion. In other words, the spring 11, 21 stiffness of the front wheel suspension 10 and the rear wheel suspension 20 is increased to suppress the forward pitch motion, the compression damping force to suppress vibration in the direction in which the front wheel spring 11 of the front wheel suspension 10 is compressed is increased, and the rebound damping force to suppress vibration in the direction in which the rear wheel spring 21 of the rear wheel suspension 20 is rebound is increased (see FIG. 3A).

In this way, by proactively performing the suspension control to suppress the forward pitch motion based on the deceleration of the vehicle, when the forward pitch motion actually occurs, the forward pitch motion may be quickly suppressed.

Figure 4:
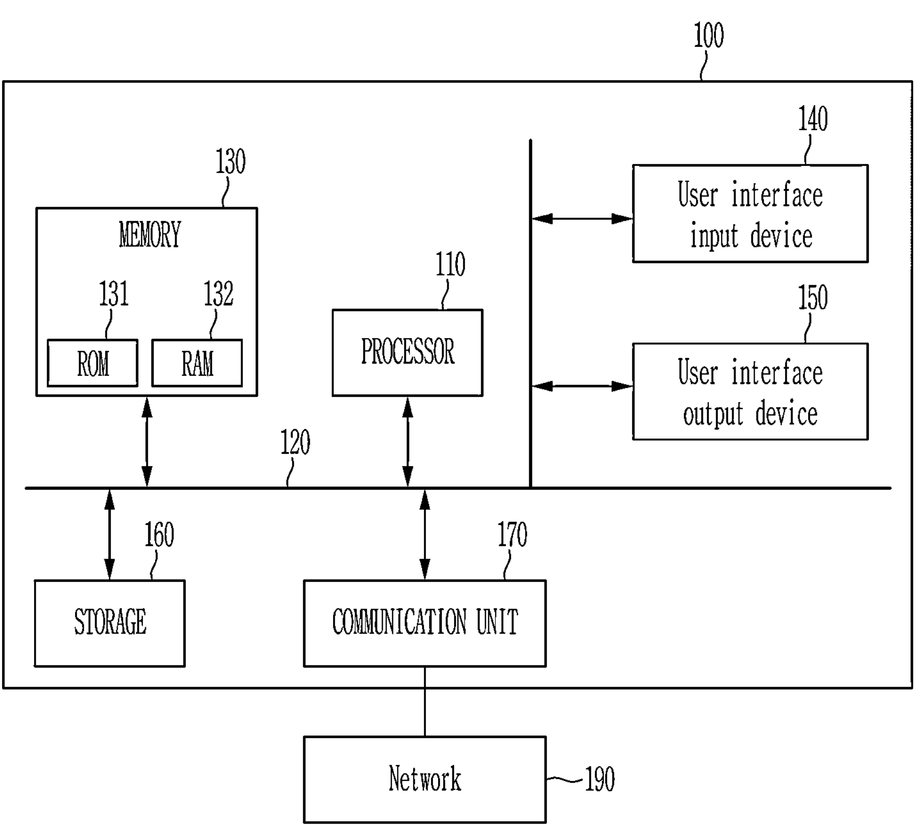
FIG. 4 is a diagram illustrating a computing device according to an embodiment.

FIG. 4 is a diagram illustrating a computing device according to an embodiment.

Referring now to FIG. 4, a method of controlling a vehicle according to the present disclosure may be implemented by using a computing device 100.

The computing device 100 may include at least one of a processor 110, a memory 130, a user interface input device 140, a user interface output device 150, and a storage device 160 communicating through a bus 120. The computing device 100 may also include a network interface 170 electrically connected to the network 190. The network interface 170 may transmit or receive signals to and from other entities through the network 190.

The processor 110 may be implemented in various types, such as a Micro Controller Unit (MCU), an Application Processor (AP), a Central Processing Unit (CPU), a Graphic Processing Unit (GPU), a Neural Processing Unit (NPU), and the like, and may be a predetermined semiconductor device executing commands stored in the memory 130 or the storage device 160. The processor 110 may be configured to implement the function and the methods described above with reference to FIGS. 1-3.

The memory 130 and the storage device 160 may include various forms of volatile or non-volatile storage media. For example, the memory may include a Read Only Memory (ROM) 131 and a Random Access Memory (RAM) 132. In the present embodiment, the memory 130 may be located inside or outside the processor 110, and the memory 130 may be connected with the processor 110 through already known various means.

In some embodiments, at least some configurations or functions of the vehicle part identifying device and method according to the embodiments may be implemented as programs or software executed on the computing device 100, and the programs or software may be stored on a computer-readable medium.

In some embodiments, at least some configurations or features of the vehicle part identifying device and method according to the embodiments may be implemented using hardware or circuit of the computing device 100, or may be implemented as separate hardware or circuit that may be electrically connected to computing device 100.

Although the embodiments of the present disclosure have been described, the present disclosure is not limited thereto, and it is possible to carry out various modifications within the scope of the claims, the detailed description of the disclosure, and the accompanying drawings, and the modifications belong to the scope of the present disclosure as a matter of course.

DESCRIPTION OF SYMBOLS

10: Front wheel suspension
11: Front wheel spring
13: Front wheel damper
20: Rear wheel suspension
21: Rear wheel spring
23: Rear wheel damper
30: Sensor unit
40: Control unit

What is claimed is:

1. A vehicle comprising:

a sensor unit for detecting driving information of the vehicle;

a front wheel suspension and a rear wheel suspension, each provided on a front wheel and a rear wheel of the vehicle, respectively, and each including a spring and a damper; and a control unit for, when a driving mode of the vehicle is an autonomous driving mode or a semi-autonomous driving mode, setting a degree of sensitivity for controlling damping force of the front wheel suspension and rear wheel suspension based on a distance to a vehicle ahead of the vehicle detected by the sensor unit, and adjusting the damping force of the front wheel suspension and rear wheel suspension according to a state of a change in distance to the vehicle ahead and a state of acceleration and deceleration of the vehicle, wherein the control unit is configured to set the degree of sensitivity for controlling the damping force of the front wheel suspension and the rear wheel suspension to one of a plurality of modes by comparing the distance to the vehicle ahead with a plurality of reference distances, wherein when the degree of sensitivity for controlling the damping force of the suspension is increased, the damping force of the suspension is automatically adjusted to be large through a small control input, and wherein when the degree of sensitivity to control the damping force of the suspension is reduced, the damping force of the suspension is automatically adjusted to be large through a large control input.

2. The vehicle of claim 1, wherein:

the driving information detected by the sensor unit includes a road surface condition of a road, the distance to the vehicle ahead, the acceleration of the vehicle, and the deceleration of the vehicle.

3. The vehicle of claim 1, wherein:

the control unit is configured to:

set the degree of sensitivity for controlling the damping force of the front wheel suspension and rear wheel suspension to a first mode of the plurality of modes when the distance to the vehicle ahead is less than a first reference distance of the plurality of reference distances;

set the degree of sensitivity for controlling the damping force of the front wheel suspension and rear wheel suspension to a second mode of the plurality of modes when the distance to the vehicle ahead is equal to or greater than the first reference distance and less than a second reference distance of the plurality of reference distances; and set the degree of sensitivity for controlling the damping force of the front wheel suspension and rear wheel suspension to a third mode of the plurality of modes when the distance to the vehicle ahead is equal to or greater than the second reference distance.

4. The vehicle of claim 1, wherein:

when the state of the change in distance from the vehicle ahead is a decreasing state, the control unit increases compression damping force of the front wheel suspension of the front wheel, and increases rebound damping force of the rear wheel suspension of the rear wheel.

5. The vehicle of claim 1, wherein:

when the state of the change in distance from the vehicle ahead is an increasing state, the control unit increases rebound damping force of the front wheel suspension of the front wheel, and increases compression damping force of the rear wheel suspension of the rear wheel.

6. The vehicle of claim 1, wherein:

when an acceleration of the vehicle is equal to or greater than a reference acceleration, the control unit additionally increases rebound damping force of the front wheel suspension of the front wheel, and additionally increases compression damping force of the rear wheel suspension of the rear wheel.

7. The vehicle of claim 1, wherein:

when a deceleration of the vehicle is equal to or greater than a reference deceleration, the control unit additionally increases compression damping force of the front wheel suspension of the front wheel, and additionally increases rebound damping force of the rear wheel suspension of the rear wheel.

8. The vehicle of claim 1, wherein:

only when a flatness of a road surface condition of a front road detected by the sensor unit is equal to or greater than a reference flatness, the control unit adjusts the degree of sensitivity for controlling damping force of the front wheel suspension and the damping force of the rear wheel suspension.

9. A method of controlling a vehicle, the method comprising:

determining, by a control unit, whether the vehicle is in an autonomous driving state or a semi-autonomous driving state;

setting, by the control unit, a degree of sensitivity for controlling damping force of a suspension based on a distance from a vehicle ahead of the vehicle, wherein the degree of sensitivity is set to one of a plurality of modes by comparing the distance to the vehicle ahead with a plurality of reference distances;

adjusting, by the control unit, the damping force of the suspension based on a state of a change in the distance from the vehicle ahead; and additionally adjusting, by the control unit, the damping force of the suspension based on an acceleration or a deceleration of the vehicle, wherein when the degree of sensitivity for controlling the damping force of the suspension is increased, the damping force of the suspension is automatically adjusted to be large through a small control input, and wherein when the degree of sensitivity to control the damping force of the suspension is reduced, the damping force of the suspension is automatically adjusted to be large through a large control input.

10. The method of claim 9, wherein:

in the setting of the degree of sensitivity for controlling damping force of the suspension, when the distance from the vehicle ahead is less than a first reference distance of the plurality of reference distances, the degree of sensitivity for controlling the damping force of the suspension is set to a first mode of the plurality of modes, when the distance from the vehicle ahead is equal to or greater than the first reference distance and less than a second reference distance of the plurality of reference distances, the degree of sensitivity for controlling the damping force of the suspension is set to a second mode of the plurality of modes, and when the distance from the vehicle ahead is equal to or greater than the second reference distance, the degree of sensitivity for controlling the damping force of the suspension is set to a third mode of the plurality of modes.

11. The method of claim 9, wherein:

when the state of the change in distance from the vehicle ahead is a decreasing state, compression damping force of a suspension of a front wheel of the vehicle increases, and rebound damping force of a suspension of a rear wheel of the vehicle increases.

12. The method of claim 9, wherein:

when the state of the change in distance from the vehicle ahead is an increasing state, rebound damping force of a suspension of a front wheel of the vehicle increases, and compression damping force of a suspension of a rear wheel of the vehicle increases.

13. The method of claim 9, wherein:

when an acceleration of the vehicle is equal to or greater than a reference acceleration, rebound damping force of a suspension of a front wheel of the vehicle additionally increases, and compression damping force of a suspension of a rear wheel of the vehicle additionally increases.

14. The method of claim 9, wherein:

when a deceleration of the vehicle is equal to or greater than a reference deceleration, the control unit additionally increases compression damping force of a suspension of a front wheel of the vehicle, and additionally increases rebound damping force of a suspension of a rear wheel of the vehicle.

15. The method of claim 9, further comprising:

determining, by the control unit, whether a flatness of a road ahead of the vehicle is equal to or greater than a reference flatness, wherein only when the flatness of the road ahead of the vehicle is equal to or greater than the reference flatness, the degree of sensitivity for controlling the damping force of the suspension is set, and damping force of the suspension is adjusted.

* * * * *